United States Patent [19]

Rogers

[11] 4,023,092
[45] May 10, 1977

[54] APPARATUS FOR SENSING METAL IN WELLS

[75] Inventor: Austin S. Rogers, Houston, Tex.

[73] Assignee: W. R. Grace & Co., New York, N.Y.

[22] Filed: Dec. 4, 1975

[21] Appl. No.: 637,523

Related U.S. Application Data

[62] Division of Ser. No. 465,081, April 29, 1974, Pat. No. 3,942,373.

[52] U.S. Cl. .............................................. 324/34 R
[51] Int. Cl.² ....................................... G01R 33/12
[58] Field of Search ...................... 324/34 R; 73/151

[56] References Cited

UNITED STATES PATENTS

| | | | |
|---|---|---|---|
| 2,782,365 | 2/1957 | Castel .............................. | 324/34 R |
| 2,817,808 | 12/1957 | Gieske ............................. | 324/34.1 |
| 3,088,068 | 4/1963 | Hall, Jr. et al. .................. | 324/34 R |

*Primary Examiner*—Robert J. Corcoran
*Attorney, Agent, or Firm*—William Kovensky; Kenneth E. Prince

[57] ABSTRACT

A new and improved wire line operated well tool for sensing metal in wells and the like, wherein a pair of coils spaced along the tool axis are moved through the well and respond unequally to ferrous material in the well. The coils are activated on alternate cycles of AC energy supplied from the surface, and the AC responses are transmitted back to the surface to indicate the location of the ferrous material. Means are provided to block any DC pulses, as could be caused by galvanic action, from disrupting the meaningful data.

5 Claims, 3 Drawing Figures

APPARATUS FOR SENSING METAL IN WELLS

This application is a division of my copending application Ser. No. 465,081, filed Apr. 29, 1974, entitled "Well Tool Apparatus and Method", assigned to the same assignee as this application, and which is now U.S. Pat. No. 3,942,373, issued Mar. 9, 1976.

The present invention relates to testing conditions in well bores, specifically, "fishing" for ferrous objects in well bores, such as casings, collars, and the like.

Figure 1:
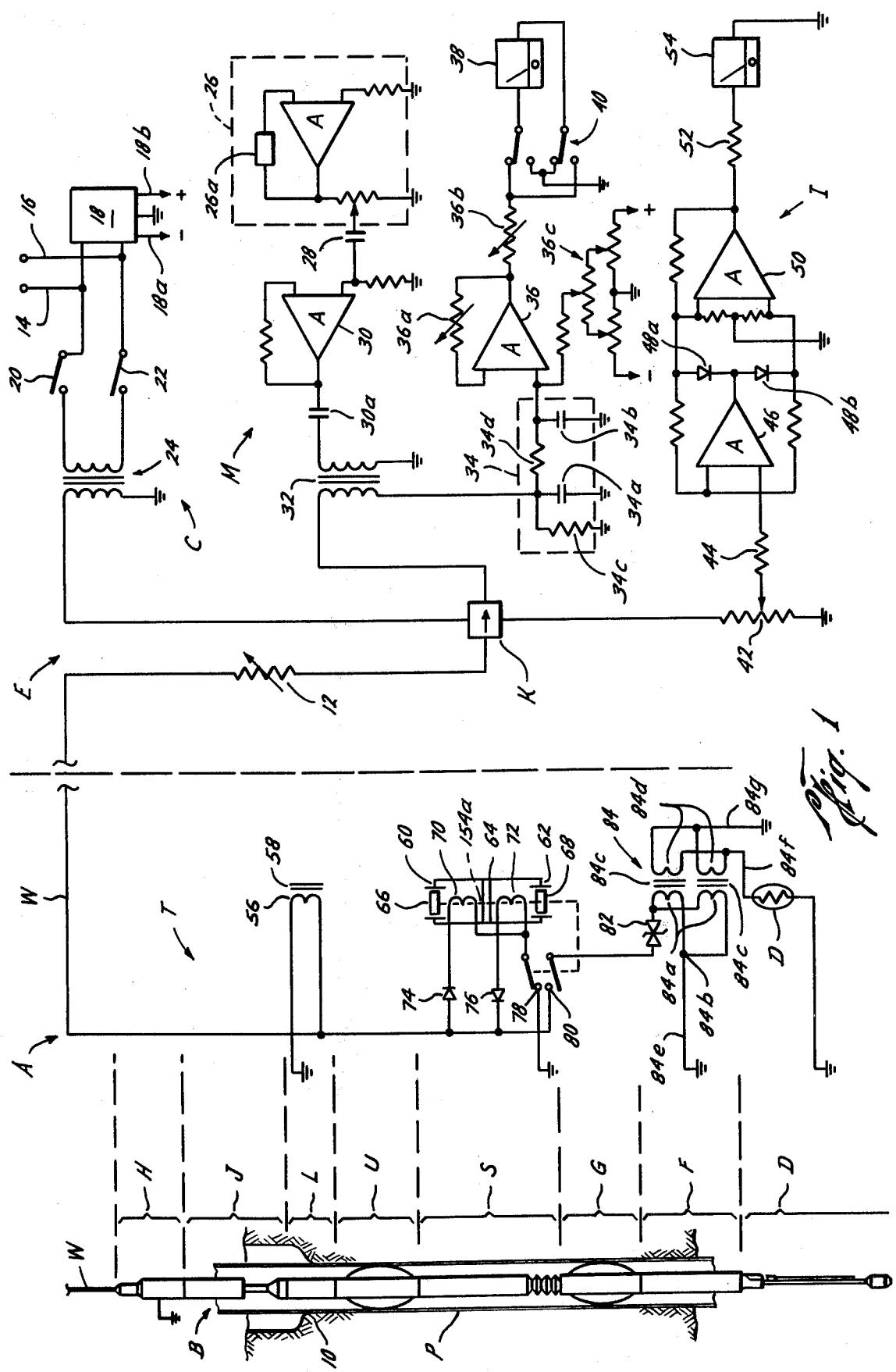
FIG. 1 is a schematic diagram of the apparatus of the present invention.

During drilling and other operations in a well bore B (FIG. 1), a pipe or casing P sometimes becomes stuck as indicated at 10 due to cave-ins and other subsurface earth movements and the like. In the drawings, the letter A (FIG. 1) designates generally the apparatus of the present invention for sensing and testing conditions at various test locations in the well bore B, which includes a surface electronic circuit E and a downhole tool T for use in the well bore B.

The downhole tool T is lowered through the well bore B by an electrically conductive wireline W. The tool T additionally has conventional sinker bars (not shown) mounted therewith in order to furnish additional weight to facilitate movement of the tool T through the pipe P in the well bore B.

The tool T includes a cable head subassembly, or sub, H which electrically connects the wireline W to the remainder of the tool T in the conventional manner. The cable head sub H has a conventional slip joint J mounted therebeneath which forms a mechanical and electrical connection between the cable headset H and a conventional casing collar locator L.

An upper bowspring U and a lower bowspring G mount a sensor unit S between spaced upper and lower portions of the drill pipe P in the well bore B. As will be set forth below, and as shown in FIG. 1, when the drill pipe P is stuck at the test location, the sensor S detects that the pipe is so stuck by sensing lack of movement of the pipe P. Alternatively, when the pipe P is free at the test location, relative movement of the drill pipe P when stressed by torque or tension from the surface is transmitted to the sensor means S by the upper bowspring U and lower bowpsring G indicating that the drill pipe P is free at the test location. The tool T is moved through the bore B to various locations during testing.

The sensor unit S thus indicates in a manner to be set forth below, the point where the drill pipe is stuck so that a detonator or backoff shot or other conventional backoff apparatus D may be used, as will be set forth, to free the drill pipe P above the stuck point. A transformer sub assembly F transfers power to the detonator D while increasing the electrical current level, so that the power consumption and voltage drop along the wireline W is reduced permitting operation of the detonator D at increased depths for deeper wells, while assuring that proper operating voltage and current levels are presented to the detonator D, as will be set forth.

The surface electronic circuit E includes a detonator control circuit and power supply C, a collar locator indicator circuit I and a sensor monitor circuit M which are selectively electrically connected to the downhole tool T by a multi-position control switch K through a variable resistor 12. The variable resistor 12 is adjusted for impedance matching with the resistance and impedance of the downhole tool T and wireline W.

The detonator control circuit C receives alternating current input power over input conductors 14 and 16 from a suitable alternating current source, such as a generator at the drilling rig or the like. A power supply circuit 18, a conventional voltage regulating direct current power supply, receives the incoming alternating current power from the conductors 14 and 16 and provides negative direct current bias potential at a negative output terminal 18a and positive direct current bias potential at a positive output terminal 18b. The power supply 18 thus provides operating direct current potential for the electronic circuits in the monitor circuit M and indicator circuit I. The power supply 18 may be of the type providing plural direct current bias levels if the electronic components of the circuit E so require.

A first control switch 20 and a second control switch 22 of the detonator control circuit C electrically connect input alternating current power when closed from the input conductors 14 and 16 to a current reducing transformer 24 so that the detonator D may be energized when the control switch K is in the proper position. It is preferable to use two control switches 20 and 22 in order to prevent inadvertent depression of a single control switch causing operation of the detonator D at an improper time, although it should be understood that only one control switch in the control circuit C may be used, if desired. The current reducing transformer 24 reduces the current received over the input conductors 14 and 16 to a low level, so that the current sent through the control switch k and the wireline W to the detonator D is at a low level and thereby the voltage drop due to the resistance of the wireline W is reduced. The transformer F increases the current level from the received over the wireline W to a sufficiently high level to energize the detonator D.

The monitor circuit M of the surface electronics E includes a conventional operational amplifier oscillator circuit 26 providing output alternating current with a predetermined frequency through a coupling capacitor 28 and a buffer operational amplifier 30 to an isolation transformer 32. The oscillator 26 has an output frequency determined by the phase shift imposed on a portion of its output signal and fed back to its input terminal through a conventional R-C feedback impedance network 26a.

The buffer amplifier 30 provides an impedance match between the oscillator 26 and the isolation transformer 32 and furnishes the output alternating current signal from the oscillator 26 through a coupling capacitor 30a to the transformer 32 so that the output signal from the oscillator 26 is furnished through the control switch K, when such switch is in the proper position, to the sensor unit S over the wireline W for freepoint sensing operations, to be set forth below. Isolation transformer 32 further prevents direct current offset signals formed in the sensor unit S during freepoint sensing from charging capacitor 30a.

The monitor circuit M further includes an integrator or low pass filter 34 which responds to the direct current offset signal formed by the sensor means S and accumulates charge in integrating capacitors 34a and 34b therein. A resistor 34c is connected in parallel with the capacitors 34a and 34b and a resistor 34d is connected in series between such capacitors to set a time constant for the integrator 34. The voltage represented by the stored charge in the capacitors 34a and 34b of the integrator circuit 34 is provided through an offset amplifier 36 having a control variable feedback resistance or potentiometer 36a, a variable calibration resistance or potentiometer 36b and a bias network 36c permitting a direct current voltmeter 38 to be set to a zero or null reading when the sensor unit S has been moved to the reference position, in a manner to be set forth below.

A two position switch 40 electrically connects the meter 38 to the output from amplifier 36 and the integrating network 34 so that positive and negative polarity direct current offset readings from the sensor unit S may be sensed by the monitor circuit M.

A gain control potentiometer 42 and input resistance 44 electrically connect the collar locator indicator circuit 1 through the control switch K to the collar locator L of the tool T. The potentiometer 42 is adjusted to set the current output level of the collar locator L furnished to the indicator circuit. The indicator circuit I includes an input amplifier 46 electrically conneted through rectifying diodes 48a and 48b to a buffer amplifier 50 so that the alternating current output from the collar locator L is rectified and provided as a direct current signal through the amplifier 50 and a connecting resistor 52 to a direct current voltmeter 54 which provides a direct current output reading in response to the proximity of the collar locator L to a drill pipe collar in the drill pipe P, as is conventional in the art.

The electrical portion of the downhole tool T includes a coil 56 and magnetic core 58 of the collar locator L which responds to the proximity of the collar locator L to a casing collar generating an electromotive force (EMF) in the coil 56 which is sensed at the meter 54 of the indicator of the indicator I in the surface electronic portion E.

The sensor S is electrically connected through the wireline W and the line compensating resistance 12 through the multiposition control switch K to the monitor circuit M. The sensor S includes a first ferromagnetic stator core 60 operably connected through the upper bowspring U at a first point of contact to pipe P and a second, or lower, ferromagnetic stator core 62 which is also operably connected to the pipe P at the first contact point thereof by means of the upper bowspring U, as will be set forth below. The sensor unit further includes an intermediate ferromagnetic core 64 operably connected with the first contact point of the pipe along with the stator cores 60 and 62.

The sensor S further includes a first, or upper, ferromagnetic rotor core 66 and a second, or lower, ferromagnetic rotor core 68, each of which is operably connected with a second point of contact of the pipe P by means of the lower bowspring G spaced from the first point of contact with the pipe P. A first or upper inductive coil 70 is mounted between the first stator 60, the intermediate core 64 and the first rotor core 66. Similarly, a second inductive coil 72 is mounted between the second stator core 62, the second rotor core 68 and the intermediate core 64.

The stator core 60, the rotor core 66 and the intermediate core 64 form a ferromagnetic circuit whose reluctance and other ferromagnetic parameters change in response to relative movement between the first and second spaced points of contact with the pipe P, varying the inductance of the inductive coil 70 so that relative movement of the pipe P forms a current sensed by the monitor circuit M of the surface electronics E to indicate that the pipe P is not stuck at the test location. In a like manner, relative movement of the first and second spaced contact points of the pipe changes the parameters of the magnetic circuit formed by the second stator core 62, the second rotor core 68 and the intermediate core 64, varying the inductance of the inductive coil 72 to indicate relative movement of the spaced portions of the pipe P. As will be set forth below, the reference position mounting of the rotor cores and stator cores in the sensor S provides an accurate and sensitive indication of movement of the pipe P during freepoint sensing.

The sensor means S is energized by alternating current sent down from the oscillator 26 of the surface electronics E through the control switch K, the line compensating resistor 12 and the wireline W. Unidirectionally conductive diodes 74 and 76, or other suitable unidirectionally conductive circuit components energize the inductive coil 70 and the second inductive coil 72 on alternate half-cycles 71a and 71b, respectively, of the alternating current. Due to the alternate energization of the inductive coils 70 and 72, variations in the refluctance parameters of the ferromagnetic circuit in the sensor S due to relative movemnt between the upper bowspring U and lower bowspring G during freepoint testing result in an offset direct current, at 73, as indicated in FIG. 7 of said parent U.S. Pat. No. 3,942,373 to be formed in the sensor S in response to movement of the pipe P. The polarity of the direct current offset further indicates the direction of movement of the pipe P. This direct current offset current provides increased accuracy freepoint readings and permits use of relatively temperature insensitive magnetic components in the sensor S, without requiring additional downhole electronics which are temperature sensitive and thus undesirable for use in deeper wells.

The downhole tool T is movable between a first operating position for sensing operations by the sensor S at a test location in the bore B and a second operating position for backoff operations by the detonator D at the test location. A sensor contact 78 completes an electrical circuit through the sensor S to an electrical ground when the downhole tool is in the first operating position, electrically connecting the sensor S to the wireline W by completing the electrical circuit therebetween. A backoff contact 80 electrically connects the detonator D to the wireline W when the downhole tool T is in the second operating position permitting backoff operations. The sensor contact 78 and the backoff contact 80 are mutually exclusively operable, electrically isolating the sensor means S from the detonator D during downhole operations. This electrical isolation between the sensor S and detonator D protects the ferromagnetic circuits of the sensor D from being excessively or permanently magnetized by the high voltage sent down the wireline W to activate the detonator D, and also prevents power loss in the sensor S by sensor loading during backoff operations insuring full power transfer to the detonator D from the wireline W.

A voltage threshold responsive means, such as a Zener diode 82, electrically connects the backoff contact 80 to a current increasing transformer 84 in the transformer sub F of the downhole tool T. The Zener diode 82 serves as further protection and isolation between the sensor S and the detonator D by preventing sensor voltage from the sensor S from firing the detonator D during sensing operations and other operations.

The transformer 84 has two primary coils 84a electrically connected in parallel between the Zener diode 82 and a tap 84b electrically connected by a return conductor 84e to ground. Two magnetic cores 84c magnetically link each primary 84a of the transformer 84 to a corresponding secondary coil 84d thereof. The secondary coils 84d are electrically connected by a conductor 84f to the detonator D and to electrical ground by a ground conductor 84g. The turns ratio between the primary coils 84a and secondary coils 84d of the transformer 84 is chosen to be a sufficiently large ratio, for example 20:1, so that the level of the electrical current sent from the control circuit C through the switch K over the wireline W to the detonator D is significantly increased in the transformer 84. In this manner, a low level current can be sent over the wireline W, decreasing the voltage drop due to the resistance in the wireline, reducing power loss therein, while insuring sufficient current to ignite the detonator D, particularly those detonators for high temperature well operations which require high current levels to ignite, and permit backoff operations in the well bore B once the stuck point of the pipe P has been located by the sensor S, in a manner to be set forth below. It should be understood that transformers with a single primary coil and secondary coil, or more than two sets of primary and secondary coils are also suitable for use with the present invention. The dual arrangement shown was used as a convenience only to fit the transformer into the successively constructed embodiment.

The sensor S, the time delay means, the transformer, and the shooting means, among other parts and the operation, are all shown and described in more detail in the parent patent identified above. To the extent the disclosure thereof is necessary to complete this disclosure, such parts are hereby incorporated by reference as if here set forth in full.

Figure 2:
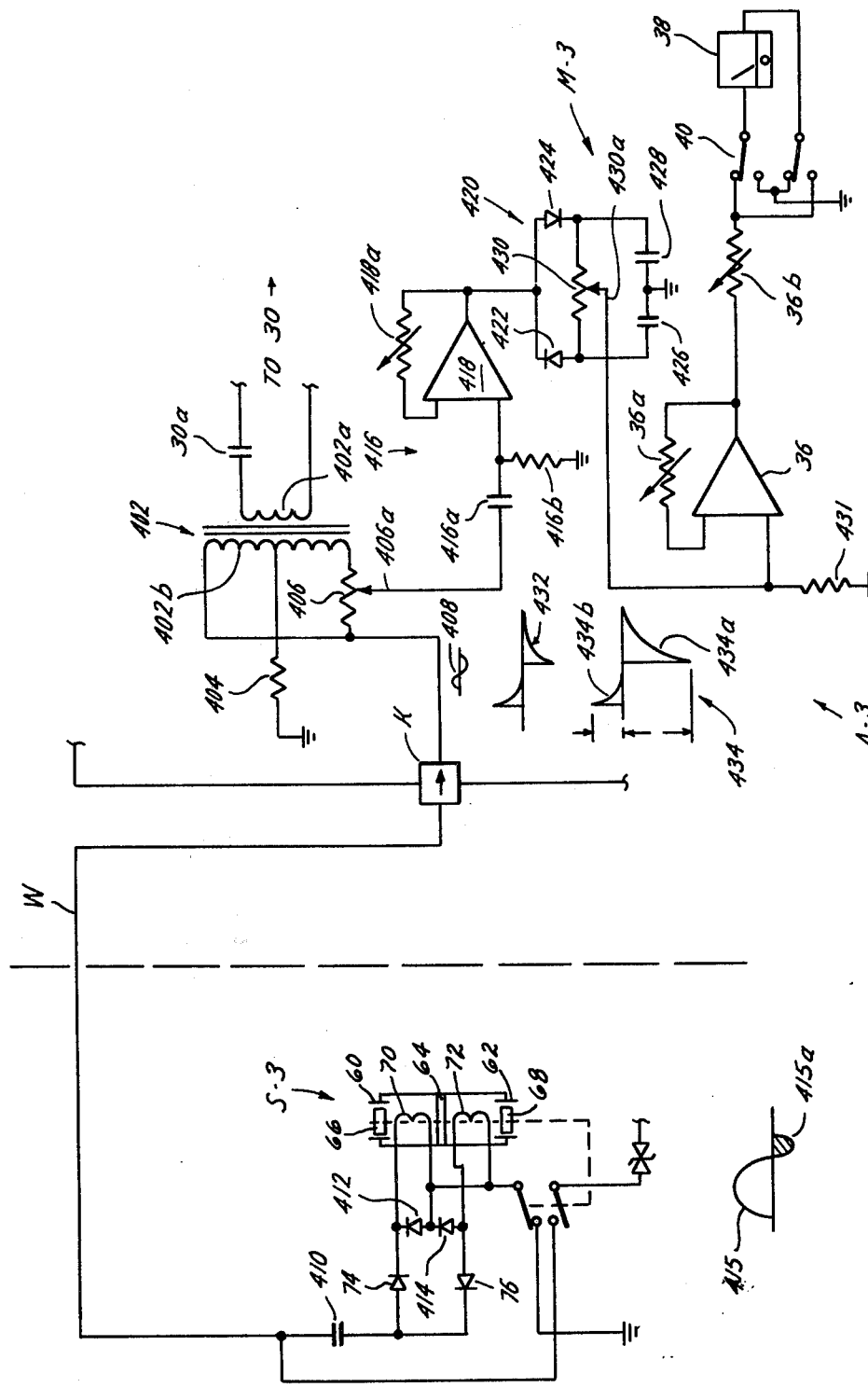
FIG. 2 is a schematic diagram of an alternative apparatus of the present invention.

In certain wells, the presence of salt water in fluids in the well bore B often gives rise to galvanic electromotive forces, reducing the effectiveness of the apparatus A which forms direct current offset signals during freepoint testing, in the manner set forth in our above identified parent patent. An apparatus A-3 (FIG. 2) with a sensor S-3 operating to form alternating current derivative pulse signals to indicate freepoints in the pipe P is adapted for use in these wells, as well as for metal detection, "fishing", generally. In the apparatus A-3, like structure to that of the apparatus A performing like functions bear like reference numerals, while certain portions of the apparatus A-3 unmodified from, and operating in the same manner as in the apparatus A, such as the collar L, transformer F, detonator D, detonator control circuit C, and indicator circuit I are not shown in the drawings (FIG. 2) for purposes of brevity and to preserve clarity therein.

A transformer 402 receives the output from the amplifier 30 through the capacitor 30a in a primary winding 402a. A secondary winding 402b of the transformer 402 is electrically connected to ground through a line ballast resistor 404. The secondary winding 402b of the transformer 402 is electrically connected through a line nulling potentiometer 406, the switch K and the wireline W to the sensor S-3, providing an alternating current signal indicated by a waveform 408.

In the sensor S-3, a D.C. blocking capacitor 410 receives the input signal from the wireline W while preventing direct current formed due to galvanic action in the well bore B from affecting the sensor S-3. Diode 74 energizes the coil winding 70 on alternate half-cycles in the manner set forth above, while damper diode 412 prevents reverse current flow through coil 70. The reverse current flow prevented by the diode 412 is that which would otherwise occur (as indicated by a shaded portion 415a of a waveform 415) due to the abrupt termination of current flow of input signal to the coil 70 from the wireline W at the end of the conductive half-cycle by the steering diodes 74 and 76.

In a like manner, diode 76 energizes the coil winding 72 on the other set of alternate half-cycles of the input signal, while damper diode 414 prevents reverse current flow therethrough due to abrupt termination of input current to the coil 72 at the end of each conductive half-cycle.

A monitor cycle M3 of the apparatus A-3 is electrically connected to a tap 406a of the line nulling potentiometer 406 at a capacitor 416a of an R-C high pass filter 46, which also includes a resistor 416b. A buffer amplifier 418, with a gain control feedback resistor 418a receives the output of the high-pass filter 416, and furnishes such output to a peak detector circuit 420.

In the peak detector circuit 420, steering diodes 422 and 424 pass pulses, formed in the sensor S in a manner set forth below, to storage capacitors 426 and 428 respectively on alternate half-cycles. The capacitors 426 and 428 store the charge provided in the form of pulses to the peak detector circuit 420, and provide a voltage respresenting the level of the charge so stored to opposite terminals of a potentiometer 430. A tap 430a of the potentiometer 430 electrically connects the peak detector 420 to the amplifier 36 at an input bias resistor 431 and to meter 38 of the monitor M-3, which operate as set forth above in the monitor M of the apparatus A.

In operation of the apparatus A-3, the sensor S-3 is lowered in the well bore B and moved to the reference or null position. With the sensor S-3 in the reference position, the coils 70 and 72 form substantially equal amplitude impulses of opppposite polarity through the switch K, as indicated by a waveform 432. The potentiometer 430 of the peak detector 420 is then adjusted and calibrated so that the voltmeter 38 reads 0 volts with the sensor S-3 providing the waveform 432 in the reference position.

The pipe P is then stretched or torqued, causing relative movement between the bowsprings U and G if the pipe P is not stuck.

The coils 70 and 72 respond by changes in their inductance due to relative movement of the rotor cores 66 and 68 with respect to their sator cores 60 and 62, in the manner set forth above for sensor S, forming peak-to-peak offset impulses of different magnitude and different polarity, as exemplified by a waveform 434 with a negative going impulse 434a being larger in absolute magnitude than a positve going impulse 434b due to the movement of the rotors 66 and 68 with respect to the stators 60 and 62, respectively. The pulses in the waveform 434 are carried by the wireline W through the switch K, high-pass filter 416 and amplifier 418 to the peak detector circuit 420.

The steering diode 422 passes the negative polarity pulses from the sensor S-3 for storage in the capacitor 426, while the steering diode passes the positive polarity pulses from the sensor S-3 for storage in the capacitor 428. When the sensor S-3 forms offset impulses of different magnitude in the manner set forth above, the capacitor receiving the larger magnitude impulses stores a greater charge than the other capacitor and thus attains a higher voltage level, causing a voltage drop across the potentiometer 430, which is sensed over the potentiometer tap 430a through the amplifier 36 to form an output indication of the relative movement of the sensor S-3 in response to movement of the pipe P, and the magnitude and direction of such movement.

When the sensor S-3 does not move in response to movement of the pipe P where such pipe is stuck, the equal amplitude impulses formed in the sensor S-3 stored in the capacitors of the peak detector circuit 420 do not unbalance the null reading indicated on the meter 38 from the potentiometer 430, indicating the stuck pipe P.

Figure 3:
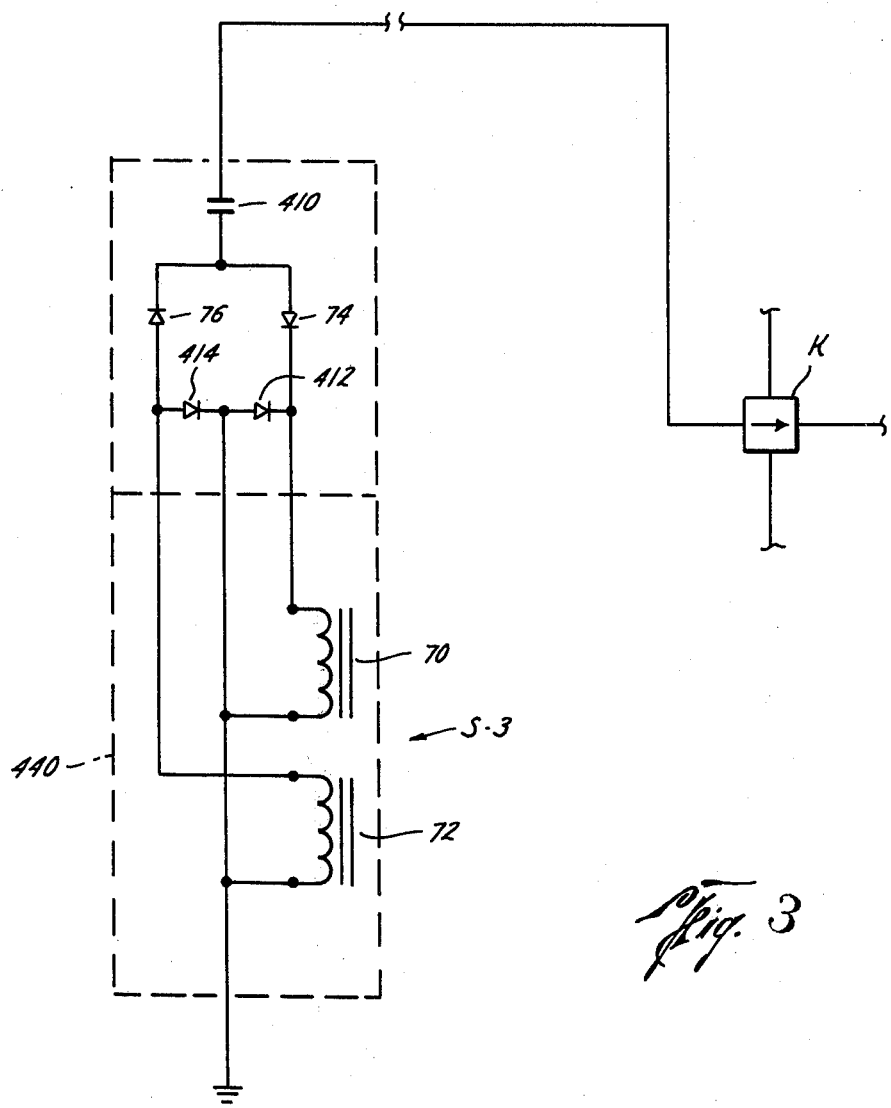
FIG. 3 is a schematic diagram of the apparatus of the present invention adapted for use as a probe and collar detector.

The sensor S-3 of the apparatus A-3 is also suitable for use, referring to FIG. 3, as a probe for ferrous objects in the well bore and as a collar detector to locate pipe collars in the well pipe or tubing, by sensing ferrous mass changes in the well tubing. In order to insure high sensitivity as a probe or collar detector, the sensor S-3 is preferably mounted in a conventional non-ferrous case shown schematically at 440 for movement in the well bore and the rotors 64, 66, and 68 and the stators 60 and 62 are removed so that magnetic flux from each of the coils 70 and 72 links with the object to be detected, whether a ferrous object or a pair of pipe collars, rather than with the flux of the other of such coils. The electrical characteristics of the coils 70 and 72 are altered in the presence of the ferrous object or ferrous mass change to be detected.

When the sensor S-3 is used as a probe or collar locator, the fields of the coils 70 and 72 remain balanced in the presence of an object which affect both fields equally and no unbalanced indication is furnished to the monitor circuit M-3. When, however, the coils 70 and 72 of the sensor S-3 are moved into the presence of the ferrous mass, or the ferrous mass change in the tubing due to the pipe collars, to be detected so that the ferrous material unequally affects the magnetic fields of the coils 70 and 72, the sensor S-3 forms peak-to-peak offset pulses, in the manner set forth above, which is indicated by the monitor circuit M-3. The sensor S-3 can then be gradually moved and changes in the readings of the meter 38 in the monitor circuit M noted to more closely locate the ferrous object for which the sensor S-3 is probing.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

I claim:

1. A probe apparatus for detecting the presence of a ferrous mass in a well bore, comprising:
   a. non-magnetic housing means adapted for movement in the well bore;
   b. sensor means mounted in said housing means, said sensor means comprising:
      1. upper inductive coil means adapted to form a magnetic field;
      2. lower inductive coil means adapted to form a magnetic field;
      3. means to supply alternate half-cycles of AC energy to said upper and lower coil means to thereby energize said coil means on alternate half-cycles to form said magnetic fields;
      4. said fields of said upper inductive coil means and said lower inductive coil means responding to the presence of a ferrous mass in the well bore unequally spaced from said upper inductive coil means and said lower inductive coil means by changing the electrical characteristics thereof to form peak-to-peak offset AC pulses which are sent to the surface;
   c. monitor means at the surface responsive to said sensor means for indicating the presence of the ferrous mass; and
   d. means in said sensor means to block any DC signals from affecting said sensor means.

2. The apparatus of claim 1, said means to supply alternate half cycles includes an array of steering diodes.

3. The apparatus of claim 1, said blocking means comprising a DC blocking capacitor.

4. An apparatus for detecting the presence of pipe collars in joints in well tubing, comprising:
   a. non-magnetic housing means adapted for movement in the well bore;
   b. sensor means mounted in said housing means, said sensor means comprising:
      1. upper inductive coil means adapted to form a magnetic field;
      2. lower inductive coil means adapted to form a magnetic field;
      3. means to supply alternate half-cycles of AC energy to said upper and lower coil means to thereby energize said coil means on alternate half-cycles to form said magnetic fields;
      4. said fields of said upper inductive coil means and said lower inductive coil means responding to ferrous mass changes in the tubing in the well bore unequally spaced from said upper inductive coil means and said lower inductive coil means by changing the electrical characteristics thereof due to the presence of pipe collars to form peak-to-peak offset AC pulses which are sent to the surface;
   c. monitor means at the surface responsive to said sensor means for indicating the presence of the pipe collars; and
   d. means in said sensor means to block any DC signals from affecting said sensor means.

5. A method of detecting changes in ferrous mass in a well or the like comprising the steps of locating a sensor means in the well via a wire line operated from the surface, providing upper and lower coil means in said sensor means, spacing said coil means apart from each other, whereby said upper and lower coil means are adapted to respond unequally to a single ferrous mass with no relative motion between the sensor and the ferrous mass, sending AC energy from the surface via said wire line to actuate said coil means, and utilizing alternate half cycles of said actuation energy to actuate said upper and lower coil means respectively, detecting the AC responses of said coils to a ferrous mass which changes the electrical characteristics thereof, sending said AC responses via said wire line to monitor means at the surface, and blocking all DC signals from affecting said sensor means.

* * * * *

UNITED STATES PATENT AND TRADEMARK OFFICE
CERTIFICATE OF CORRECTION

PATENT NO. : 4,023,092
DATED : May 10, 1977
INVENTOR(S) : Austin S. Rogers

It is certified that error appears in the above–identified patent and that said Letters Patent are hereby corrected as shown below:

On the title page, left hand column, item (73), change the assignee from "W. R. Grace & Co." to --Homco International, Inc.--.

Signed and Sealed this

Tenth Day of July 1979

[SEAL]

Attest:

LUTRELLE F. PARKER
*Attesting Officer*   *Acting Commissioner of Patents and Trademarks*